March 29, 1927.
J. MYERS
1,622,802
PARKING DEVICE FOR MOTOR VEHICLES
Filed Nov. 9, 1925  2 Sheets-Sheet 2
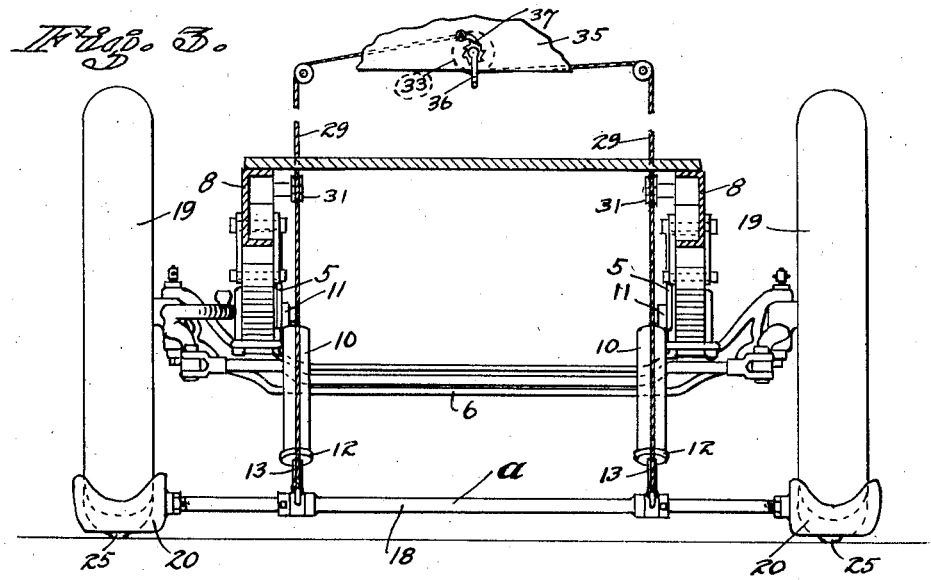
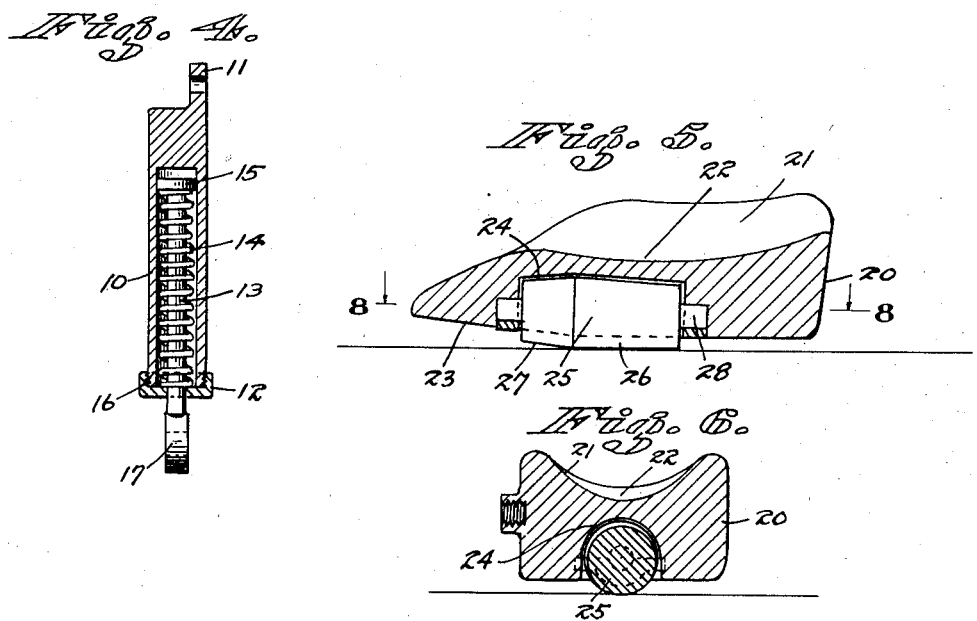
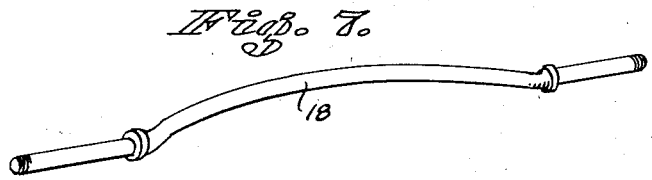
Inventor
JOHN MYERS
By
Attorneys.

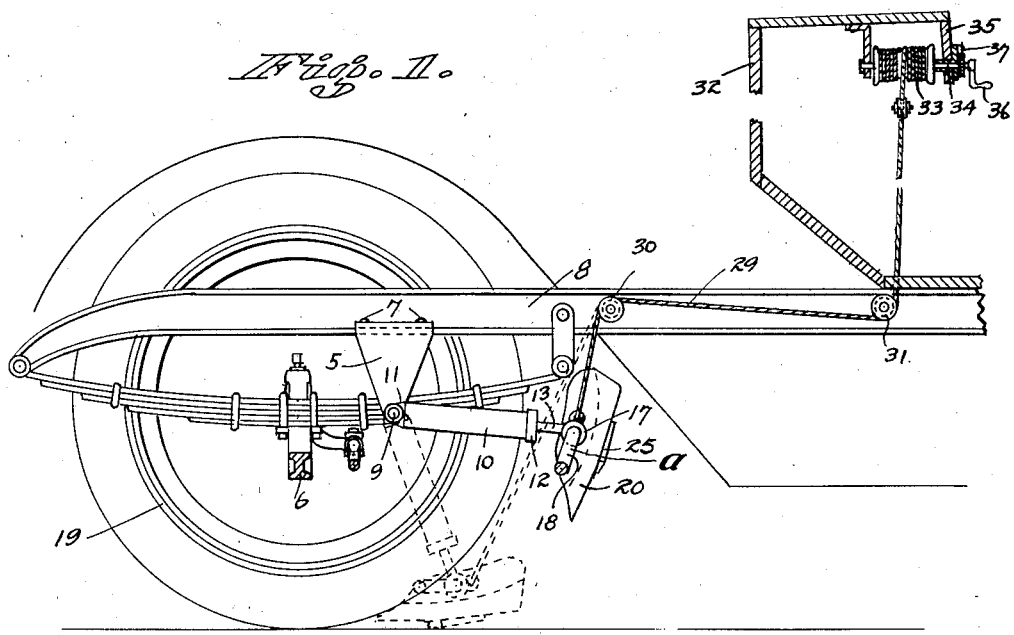
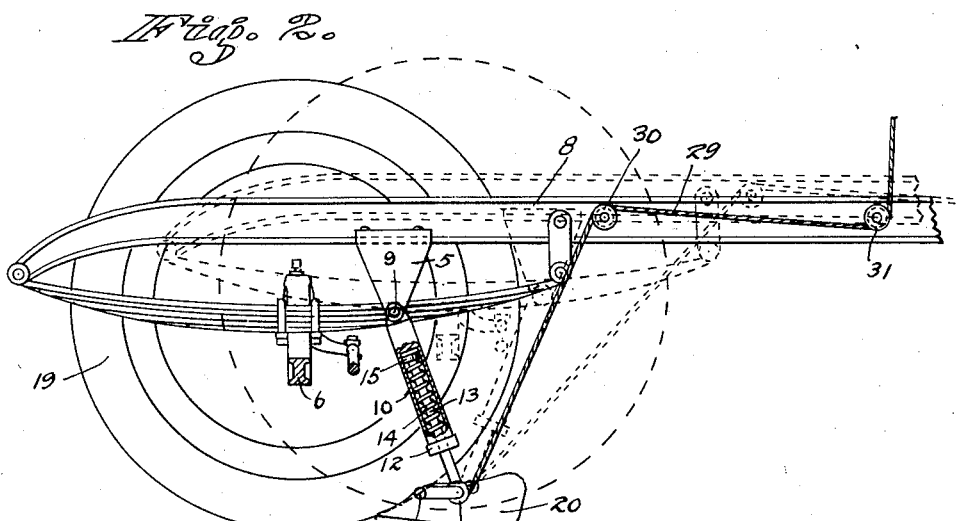
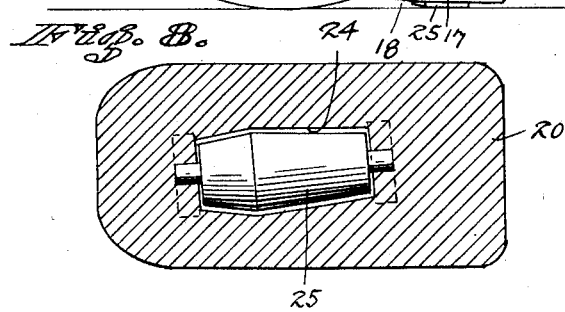

Patented Mar. 29, 1927.

1,622,802

UNITED STATES PATENT OFFICE.

JOHN MYERS, OF OROVILLE, CALIFORNIA.

PARKING DEVICE FOR MOTOR VEHICLES.

Application filed November 9, 1925. Serial No. 67,987.

This invention relates to improvements in parking attachments for motor vehicles.

The object of the present invention is to provide for effecting the expeditious parking of a motor car in relatively short spaces such as are frequently found between two motor cars parked in spaced relation alongside the curbing of a street.

The above and other objects are accomplished by instrumentalities pointed out in the following specification.

The invention is clearly defined in the claims.

A satisfactory embodiment of the invention is illustrated in the accompanying drawings forming part of the specification and in which—

Figure 1 is a central vertical section of the device showing a portion of the chassis and body of a motor vehicle and the device applied thereto.

Figure 2 is a view similar to Figure 1, and showing by full lines the position of the device as it appears when adjusted ready for use and further showing by dotted lines the device as it appears when in use.

Figure 3 is a rear elevation of the device and showing a portion of a motor car in transverse vertical section.

Figure 4 is a vertical cross-section of one of the arms of the swinging support.

Figure 5 is a detail vertical section of one of the shoes.

Figure 6 is a transverse section of the shoe shown in Figure 5.

Figure 7 is a detail perspective of the tie bar, and

Figure 8 is a horizontal cross-section on the line 8—8 of Figure 5.

In carrying out the present invention I arrange a pair of hangers 5—5 rearwardly of the front axle 6 of a motor vehicle and secure these hangers as by rivets 7 to opposite portions of the side members 8 of the vehicle frame. At the lower ends of the hangers which are disposed above the front axle 6, inwardly extending pins 9 are secured to provide bearing points for a swinging support a. The arms of the support a include a pair of cylinders 10—10 permanently closed at one end and there provided with pierced lugs 11 for the reception of the pins 9. Removable caps 12 on the opposite ends of the cylinders are pierced to provide guide openings for slidable rods 13 which slide within the cylinders. Each of the cylinders 10, as shown in Figure 4, is interiorly provided with a compression spring 14 surrounding the rod 13 and bearing at one end on a piston 15 at the inner end of the rod and at its opposite end on the removable head 12 which is prevented against accidental displacement from the cylinder as by screw threads 16. The outer ends of the rods 13 terminate in circular heads 17 pierced for the reception of a cross bar 18.

The opposite ends of the cross bar extend to a point adjacent to the inner faces of the front wheels 19 and are adapted for connection to the opposed inner faces of a pair of shoes 20—20. The shoes 20 are arranged in alinement with the wheels 19 and each is in the form of a casting, as shown in Figures 5 and 6, having a longitudinally grooved upper face 21 of a size to extend around a section of the tread of an ordinary tire. The length of the grooved portion 21 is such as will accommodate a segment of an ordinary tire and the floor of the groove is concave as at 22 to provide for the surface configuration of the tire. At one end the shoe slopes downwardly from the groove 21 and merges into the lower face 23 so that an inclined surface and a relatively sharp end are provided at one end of each shoe.

A recess 24 is formed in the lower face of each of the shoes for the reception of a bearing member 25. The bearing member 25 is in the form of opposed truncated cones of different lengths as indicated by 26 and 27, and the bearing member is horizontally disposed in the recess 24 and its ends are provided with pins 28 which are journaled in bearings formed in the end walls of the recess 24. The shoes 20 are disposed so that the sloped pointed end portions thereof are directed toward the rear segments of the front wheels 19, and the bearing members 25 are arranged in the direction of the lengths of the shoes and disposed so that the shorter cone shaped portions 27 are adjacent to the sloped ends of the shoes. The bearing members are further disposed at a cant with respect to the longitudinal central line of the car and their axes, therefore, extend obliquely outward.

The pointed end portions of the shoes are adapted to engage underneath the lower rear segments of the tires when the swinging support is lowered to the position shown by dotted lines in Figure 1 at which time the bearing members 25 contact with the ground. In this position the shoes are supported through their connection with the hangers 5 so that the inclined surfaces of the shoes form bearing surfaces for the tires when rearward movement is imparted to the vehicle. The sloped surfaces 27 permit forward tilting movement of the shoes under downward pressure of the wheels during the initial rearward movement of the vehicle, and thereby facilitate the movement of the wheels upon the shoes. As rearward movement of the vehicle continues, the front wheels move into the grooves 21 whereupon the weight causes the shoes to tilt until the portions 27 of the bearing members rest upon the ground. In this movement on the part of the front wheels, the vehicle moves relatively to the shoes and to the swinging support and the points of connection between the hangers and the cross bar 18 recede against the action of the compression springs 14 which remain tensioned throughout the time that the front wheels are supported by the shoes as shown by dotted lines in Figure 2.

The swinging support is normally held elevated to the position shown by full lines in Figure 1 in any suitable manner for quick release. In the embodiment shown flexible elements 29 are connected to the cross bar 18 and are directed upwardly and trained over pulleys 30 secured to the side members 8 and under pulleys 31 also secured to the side members 8. From the pulleys 31 the flexible elements are directed upwardly through the cowl 32 of the vehicle and are reversely wound upon a drum 33 supported on a shaft 34 journaled in suitable bearings within the cowl, one end of the shaft extending through the instrument board 35 and being provided with a crank handle 36 which is turned to operate the flexible elements to lower and elevate the shoes.

A suitable pawl and ratchet mechanism 37 as shown in Figure 3, may be employed for locking the drum against rotation when the shoes are in their elevated positions as shown in Figure 1.

In the operation of parking a car equipped with my device alongside a curb and between two spaced vehicles, the rear end of the car is directed toward one end of the space in the usual manner whereupon the front wheels are turned into alinement with the rear wheels and the shoes lowered into contact with the ground. The car is then caused to move rearwardly and the traction of the rear wheels advances the front wheels upon the shoes. When the front wheels are wholly upon the shoes, the usual slope toward the curbing of the roadway and the tendency of the bearing members to roll, and any drag into continued rearward movement of the vehicle causes the front end portion of the vehicle to swing abruptly inward or toward the curb. This inward movement is, of course, accelerated by the contour of the portions 26 of the bearing members, so that the vehicle is turned in a comparatively short radius and moved to a parallel position with the curb. Forward movement on the part of the vehicle after the front wheels thereof are upon the shoes, results in the front wheels moving forwardly and away from the shoes as these are held by friction into contact with the ground after which the shoes may be raised into inoperative position by means of the flexible elements, as previously described.

Although I have shown and described one embodiment of my invention, it is to be understood that the same is susceptible of various changes; and I reserve the right to employ such as may come within the scope of the appended claims.

I claim:

1. In combination with a motor vehicle, an extensible support pivotally connected at one end to the frame of the vehicle and disposed rearwardly of the front axle thereof and adapted to swing upwardly and rearwardly from a substantially vertical position, shoe members carried by the support and constructed and arranged to extend under the rear lower segments of the front wheels and having frusto-conical rollers in their lower faces adapted to make contact with the ground when the support extends downwardly whereby the front wheels of the vehicle are caused to ascend the shoes upon rearward movement of the vehicle.

2. In combination with a motor vehicle, an extensible support pivotally connected at one end to the frame of the vehicle and disposed rearwardly of the front axle thereof and adapted to swing upwardly and rearwardly from a substantially vertical position, shoe members carried by the support and constructed and arranged to extend under the rear lower segments of the front wheels and having frusto-conical rollers in their lower faces adapted to make contact with the ground when the support extends downwardly whereby the front wheels of the vehicle are caused to ascend the shoes upon rearward movement of the vehicle.

3. In combination with a motor vehicle, an extensible support including yieldingly connected telescoping members connected at one end to the frame of the vehicle and disposed rearwardly of the front axle thereof and adapted to swing upwardly and rearwardly from a substantially vertical position, oblong shoe members having sloped upper surfaces secured to the support, said shoe members being constructed and arranged so as to extend with the lower portions of their sloped surfaces under the rear lower segments of the front wheels and having frusto-conical rollers in their lower faces making contact with the ground when the support extends downwardly whereby the front wheels of the vehicle are caused to ascend the sloped surfaces of the shoes upon rearward movement of the vehicle.

JOHN MYERS.